(12) United States Patent
Kumar et al.

(10) Patent No.: US 10,319,239 B2
(45) Date of Patent: Jun. 11, 2019

(54) SYSTEMS AND METHODS FOR CONTEXT BASED CPDLC

(71) Applicant: Honeywell International Inc., Morristown, NJ (US)

(72) Inventors: Rakesh Kumar, Karnataka (IN); Maria John Paul Dominic, Karnataka (IN); Vivek Kumar Pandey, Uttar Pradesh (IN); Siva Kommuri, Karnataka (IN); Darshan Gandhi, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 401 days.

(21) Appl. No.: 14/448,923

(22) Filed: Jul. 31, 2014

(65) Prior Publication Data

US 2016/0035227 A1    Feb. 4, 2016

(51) Int. Cl.
*G08G 5/00* (2006.01)
*G01C 23/00* (2006.01)

(52) U.S. Cl.
CPC ........... *G08G 5/0013* (2013.01); *G01C 23/00* (2013.01); *G08G 5/0021* (2013.01)

(58) Field of Classification Search
None
See application file for complete search history.

(56) References Cited

U.S. PATENT DOCUMENTS

| | | | |
|---|---|---|---|
| 2008/0163093 A1* | 7/2008 | Lorido | G01C 23/00 715/771 |
| 2010/0030401 A1 | 2/2010 | Rogers et al. | |
| 2011/0270992 A1 | 11/2011 | Judd et al. | |
| 2012/0066617 A1 | 3/2012 | Gupta et al. | |
| 2012/0078447 A1 | 3/2012 | McGuffin et al. | |
| 2012/0277986 A1 | 11/2012 | Judd et al. | |
| 2013/0090786 A1 | 4/2013 | Judd et al. | |
| 2013/0263014 A1 | 10/2013 | Chalak | |
| 2013/0268867 A1 | 10/2013 | Martin et al. | |

OTHER PUBLICATIONS

Judy et al., "In-Aircraft Flight Planning With Datalink Integration", "U.S. Appl. No. 14/156,164, filed Jan. 15, 2014", Jan. 15, 2014, pp. 1-38, Published in: US.
European Patent Office, "Extended European Search Report from EP Application No. 15177591.3 dated Dec. 15, 2015", "from Foreign Counterpart of U.S. Appl. No. 14/448,923", Dec. 15, 2015, pp. 1-9, Published in: EP.
European Patent Office, "Communication Pursuant to Article 94(3) from EP Application No. 15177591.3", Counterpart to U.S. Appl. No. 14/448,923, dated Oct. 9, 2018, pp. 1-6, Published EP.

* cited by examiner

*Primary Examiner* — Lail A Kleinman
(74) *Attorney, Agent, or Firm* — Fogg & Powers LLC

(57) ABSTRACT

Systems and methods for context based controller pilot data link communication (CPDLC) are provided. In certain implementations, a method for CPDLC includes receiving data through the selection of a selectable item on a pilot interface, wherein the pilot interface is a non-CPDLC interface and communicating the data to a CPDLC application. Further, the method also includes constructing a CPDLC message based on the data; and transmitting the CPDLC message to an air traffic controller.

19 Claims, 3 Drawing Sheets

SYSTEMS AND METHODS FOR CONTEXT BASED CPDLC

BACKGROUND

Controller-pilot data link communication (CPDLC) facilitates the communication between controller and pilot by using a data link for ATC communication that allows human involvement by both the controller and the pilot. In certain implementations, different messages sent through uplinks and downlinks between the controller and pilot are sent using interactive screens. However, different messages are frequently associated with different screens. As such, when a pilot is communicating through different screens, the pilot may have to navigate from one screen to another, which navigation takes the time and the attention of the pilot away from other important aviation tasks.

SUMMARY

Systems and methods for context based controller pilot data link communication (CPDLC) are provided. In certain implementations, a method for CPDLC includes receiving data through the selection of a selectable item on a pilot interface, wherein the pilot interface is a non-CPDLC interface and communicating the data to a CPDLC application. Further, the method also includes constructing a CPDLC message based on the data; and transmitting the CPDLC message to an air traffic controller.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
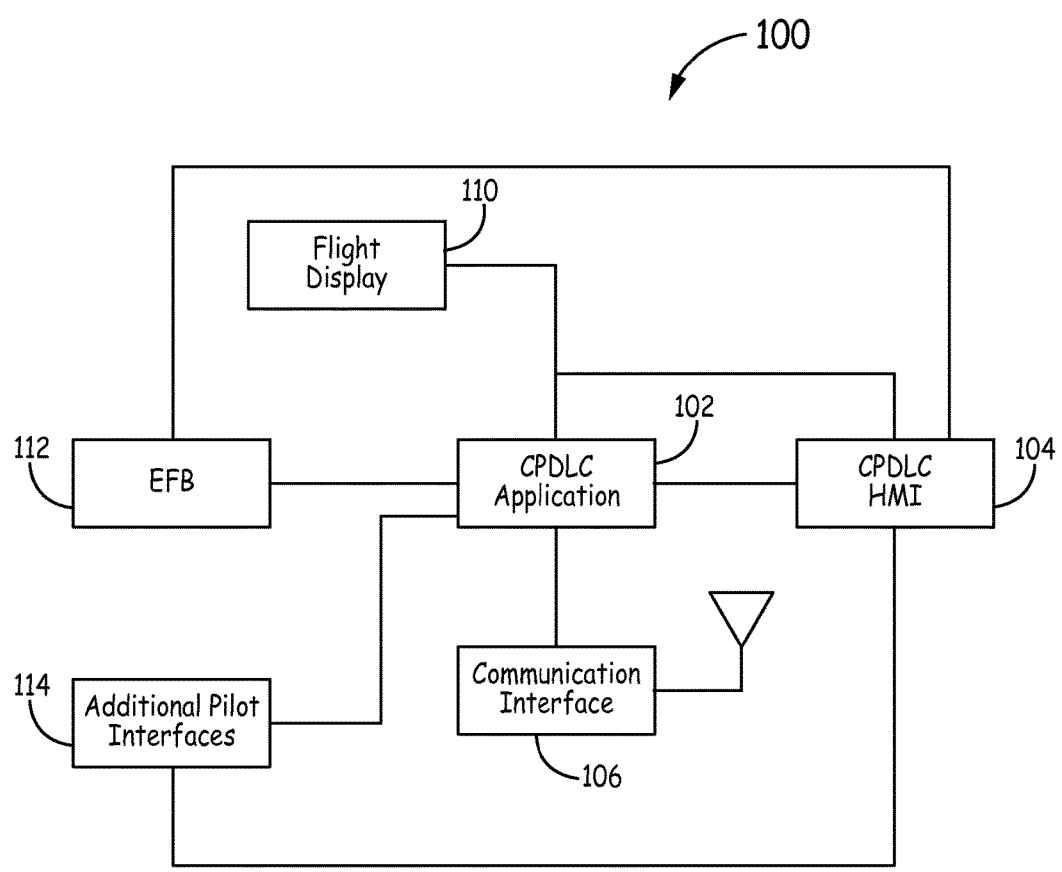
FIG. 1 is a block diagram of a system for context based controller pilot data-link communication in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein provide systems and methods for context-based CPDLC. A context-based CPDLC system allows a pilot to send a CPDLC downlink message to an air traffic controller through interactive display screens that are primarily used for other non-CPDLC tasks. For example, a pilot may use multiple interfaces while flying an airplane. For instance, a pilot may use a primary flight display, a multi-function display, an electronic flight bag, or other interface during the operation of an airplane. The interfaces process and generate information that can be used by a pilot when communicating with a controller through a CPDLC application. Thus, to streamline the tasks performed by a pilot, the pilot can direct the interfaces other than CPDLC interface to generate data to be sent to the controller through a CPDLC downlink. Due to the streamlined generation of CPDLC messages, the pilot is able to provide data to the controller without having to navigate through different screens on the CPDLC interface.

FIG. 1 is a system 100 located on an aircraft, where the system 100 provides context-based CPDLC for a pilot when forming downlink messages from the pilot to the controller. In certain embodiments, the system 100 includes CPDLC application 102. As used herein, the CPDLC application 102 refers to a communication system that uses a data link to facilitate communications between a pilot and an air traffic controller. In at least one exemplary implementation, the CPDLC application 102 provides air-ground data communication between the pilot and controller that includes a set of messages that correspond to phrases employed by defined air traffic control procedures. For example, the controller and pilot may each be able to communicate through a set of defined messages that are clearly understood by both the pilot and the controller. For example, a controller may communicate level assignments, crossing constraints, lateral deviations, route changes and clearances, speed assignments, radio frequency assignments, along with various requests for information. In conjunction, the pilot may be able to respond to messages, request clearances and information, report information and declare/rescind an emergency. Further, a pilot may also request conditional clearances and information from a future controller. In at least one additional implementation, information may also be transmitted through a "free text" capability. Further, the CPDLC application 102 may also be able to facilitate communications according to different communication standards. For example, the CPDLC application 102 may be able to communicate via FANS, ATN, or the like.

In certain embodiments, the CPDLC application 102 presents message screens to a pilot to facilitate the communication of controller information to the pilot and the formation of downlink messages for the controller. To present the message screens to the pilot, the CPDLC application 102 may be coupled to a CPDLC Human Machine Interface (HMI) 104. The CPDLC HMI 104 may be a Control Display Unit (CDU) on Flight Management System (FMS). Alternatively, the CPDLC HMI 104 may be a Multi-function Control Display Unit. For example, when the CPDLC HMI 104 is part of a FMS, the CPDLC HMI 104 may provide a user interface to the FMS that communicates with the auto pilot and other systems of the aircraft to control the flight management of the flight plan.

When communicating with the CPDLC application 102, the CPDLC HMI 104 functions as a display device to present CPDLC screens generated by the CPDLC application 102. In one exemplary implementation, the CPDLC HMI 104 may comprise a Multifunction Display that includes a forward field graphical display device that displays screens to the flight crew and provides a cursor controlled interface to flight crew users. In another implementation, as discussed above, the CPDLC HMI 104 may include a CDU, such as an MCDU. When the CPDLC HMI 104 is a CDU, the CPDLC HMI 104 may include a display area, a plurality of programmable buttons on either side of the display area, and a keyboard interface. In one embodiment, the common display device 132 comprises a MFD which presents the flight crew with a graphical representation having the "look and feel" of an MCDU.

Further, in at least one embodiment, the CPDLC application 102 is coupled to a communication interface 106. As one having skill in the art may appreciate, the communication interface 106 transmits data to and receives data from a controller. For example, the communication interface 106 may communicate with the controller via a SATCOM data link, a VHF data link, or other communication data link. The CPDLC application 102 receives data from and sends data to the controller via the communication interface 106.

Frequently, to communicate with the controller through the CPDLC HMI 104, a pilot may navigate through the different screens on the CPDLC HMI 104 to review messages received from the controller and then navigate to different screens to form responses to the controller. However, the navigation through the screens, no matter how efficiently and intuitively organized, requires the time of the pilot and draws the attention of the pilot away from other flight tasks. To increase the pilot efficiency in regards to the use of the CPDLC application 102, the CPDLC application 102 is coupled to at least one non-CPDLC user interface that acquires and generates data that may be used in the formation and generation of CPDLC communication data. As used herein, the terms non-CPDLC interface, non-CPDLC user interface, and pilot interface refer to a human machine interface which receives commands from or provides data to a pilot other than a dedicated CPDLC HMI. For example, the CPDLC application 102 may be coupled to the flight display 110, an electronic flight bag (EFB) 112, or additional pilot interfaces 114. When the CPDLC application 102 is coupled to the flight display 110, the EFB 112, or other pilot interfaces 114, the pilot may select data or screens to be transmitted from the CPDLC application 102 to a controller based on the context of the data being accessed on the flight display 110, the EFB 112, or the other pilot interfaces 114.

In certain embodiments, when the CPDLC application 102 is coupled to a flight display 110, the flight display 110 may be a primary flight display (PFD), navigation display, a multi-function display, or other display interfaces. Alternatively, the flight display 110 may also encompass the multifunction display and both displays may comprise parts of a "glass cockpit," as the term is understood in the art. When the flight display 110 is a PFD, the PFD provides an LCD or CRT display device that displays flight information. For example, the PFD may display information that includes an attitude indicator, a stall angle, a runway diagram, an ILS localizer and glide-path needles, airspeed and altitude indicators, a vertical speed indicator, a heading display, navigational marker information, bugs, ILS glideslope indicators, course deviation indicators, among other types of displayable information. As the pilot interfaces with the flight display 110, the flight display 110 may send data to the CPDLC application 102.

Further, as stated above, the CPDLC application 102 may be able to receive data from EFB 112. For example, EFB 112 is an electronic device that aids flight crew members in the performance of flight management tasks. Material stored on an EFB 112 may include an aircraft operating manual, flight-crew operating manual, navigational charts, and other aviation data that a pilot may find helpful during the piloting of an aircraft. Further, an EFB 112 may function as a multi-function display. For instance, the EFB 112 may function as part of an Automatic Dependent Surveillance-Broadcast system. Like the flight display 110, the EFB 112 may send information to the CPDLC Application 102.

In at least one other implementation, the CPDLC application 102 may also be coupled to additional pilot interfaces 114. The additional pilot interfaces 114 may include other cockpit components used in an electronic flight instrument system (EFIS). For example, the additional pilot interfaces 114 may include an engine indications and crew alerting system that displays information regarding the various aircraft systems, such as fuel levels and engine operation. Also, the additional pilot interfaces 114 may also include instrumentation related to control panels that are used to control the operation of an aircraft.

In certain implementations, as a pilot interfaces with multiple sources of information and control available in the cockpit of an aircraft, either through the flight display 110, the EFB 112, or the additional pilot interfaces 114, the pilot can direct the interfaces to send data to the CPDLC application 102. When the CPDLC application 102 receives the information from the interfaces, the CPDLC application 102 may use the information in the formation of a CPDLC message for communication with a controller through the communication interface 106. Alternatively, the information may be communicated to the CPDLC HMI 104, where the information may be then communicated to the CPDLC application 102.

In a further embodiment, after the CPDLC application 102 has transmitted messages through the communication interface 106 to an air traffic controller, the CPDLC application 102 may receive confirmation messages to any sent requests or other type of data from the air traffic controller. In at least one implementation, when the CPDLC application 102 receives uplink data from an air traffic controller, the CPDLC application 102 may send the data to one or more of the displays that are viewable by the pilot. For example, when the message received from the air traffic controller is a confirmation of a previously transmitted request, the CPDLC 102 may send the data to the display that originally provided the transmitted request to the CPDLC 102. Alternatively, the CPDLC 102 may send the uplink data to a display that is currently being used by a pilot.

In at least one implementation, when the pilot directs one of the interfaces to send data to the CPDLC application 102, the pilot selects a portion of information to communicate to the CPDLC application 102. For example, the pilot may use a cursor control device, a touchscreen, or other control device to select data on the interfaces. When the data is selected, the pilot may instruct the interface how to send the data to the CPDLC application 102. In one example, the CPDLC application 102 may be displaying a screen that has a field to be populated with data before a message can be sent to the controller. To populate the field, the pilot may go to the appropriate interface and select data to be sent to the CPDLC application 102 or CPDLC HMI 104, which populates the field with the received data. Alternatively, the pilot may select a screen for display on the CPDLC HMI 104 through one of the pilot interfaces. For example, the pilot may select a data item on the flight display 110 and a selectable menu appears listing different CPDLC screens that may use the identified data item. The pilot then selects the menu item that corresponds with the desired CPDLC screen. In a further implementation, the pilot may select a CPDLC message for transmission from one of the non-CPDLC interface screens. For example, the pilot or other flight crew member may identify data for transmission as a CPDLC screen on one of the pilot interfaces. The pilot interface then will send the data to the CPDLC application 102, which then sends the data out as a complete message to the controller without presenting the data to the pilot as a screen on the CPDLC HMI 104.

As described above, by using the other pilot interfaces to identify data for the creation of CPDLC messages, a pilot may be able to communicate with a controller while operating other systems within the cockpit. Because the pilot is able to give less attention to CPDLC communications and the selection of screens through the CPDLC HMI 104, the workload of the pilot is decreased and the pilot is able to be more focused during the operation of the aircraft.

Figure 2:
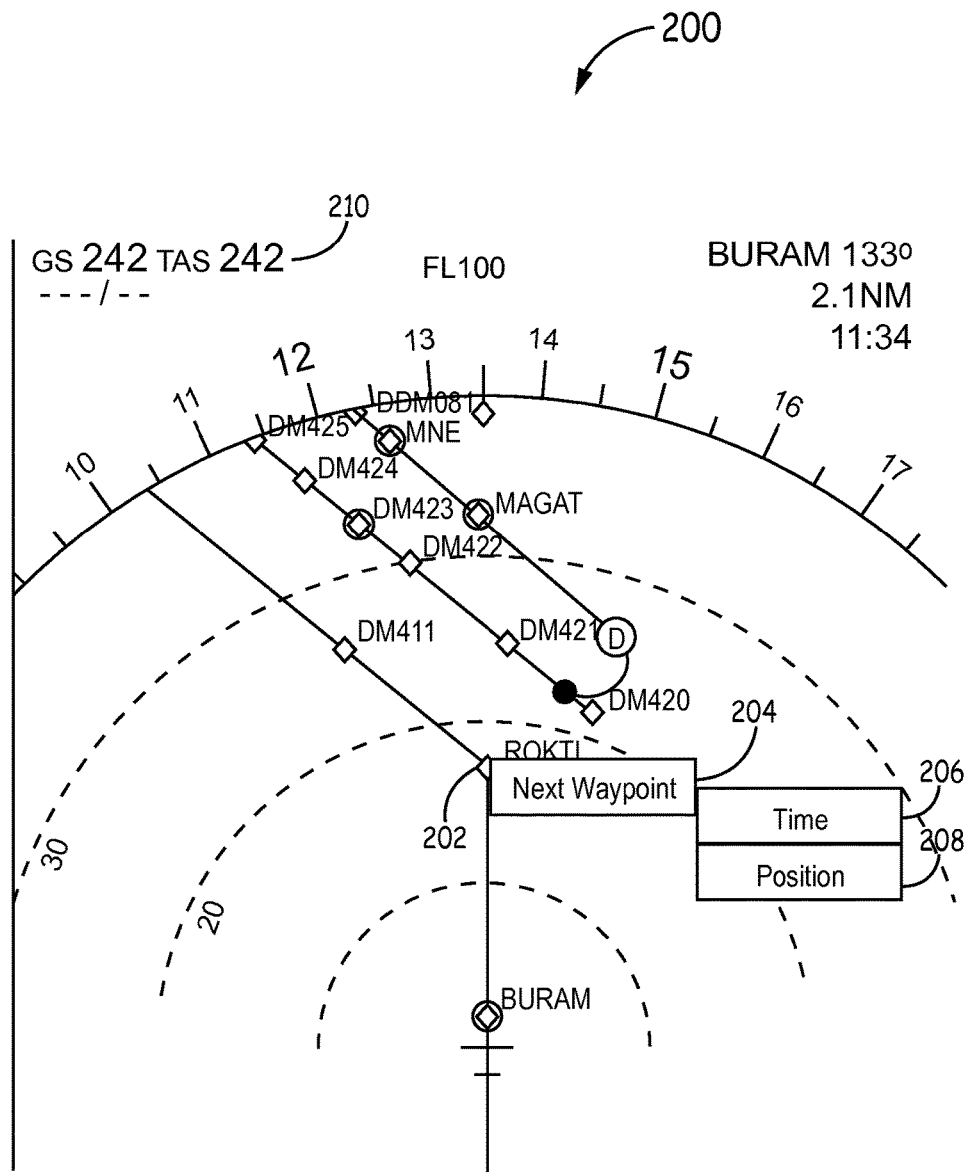
FIG. 2 is an image of a display that is able to provide information for context based controller pilot data-link communication in one embodiment described in the present disclosure.

FIG. 2 is a diagram of a display 200, such as would be found in a navigation display, where the display 200 illustrates the selection of a CPDLC message through a non-CPDLC display. For example, the display 200 shows navigation type info such as route, waypoints, air traffic, airports, and navigational aids, among other information types. In some implementations, the display 200 may be customized according to the preferences of the pilot to show the information the pilot uses to navigate according to the flight plan. Further, the display 200 may include information that can be shared with ATC or includes information that can be provided to the ATC if a change in the flight plan is needed. For example, if a pilot determines that a deviation from the flight plan is necessary, then the pilot informs the ATC about the change and to communicate with the ATC the pilot communicates through the CPDLC.

In one example of requesting a change to the flight plan, a pilot may want to change the speed of the aircraft. To communicate the change in speed to the ATC, a pilot may move a cursor over a speed indication such as speed indication 210. The pilot may then right click on the speed indication 210. In response to the right click, the display 200 may display options related to the velocity. For example, the display 200 may show the option "Request [speed]." If the pilot clicks on the "Request [speed]" option, a CPDLC HDMI will display the Request speed downlink CPDLC page, from which a pilot can enter in the information and transmit the information to the ATC.

In another example, a pilot may use the display 200 to communicate information regarding the next waypoint 202 on the flight path. To provide information, the pilot may click on the next waypoint 202 as shown in the display. Upon logging the click, the display 200 identifies the waypoint 202 with a menu heading 204 and related menu items time 206 and position 208. If the pilot selects menu item time 206, the pilot will send a downlink message with the time information for the next waypoint to the controller. If the pilot selects menu item position 208, the pilot will send a downlink message with the position information for the next waypoint to the controller.

Figure 3:
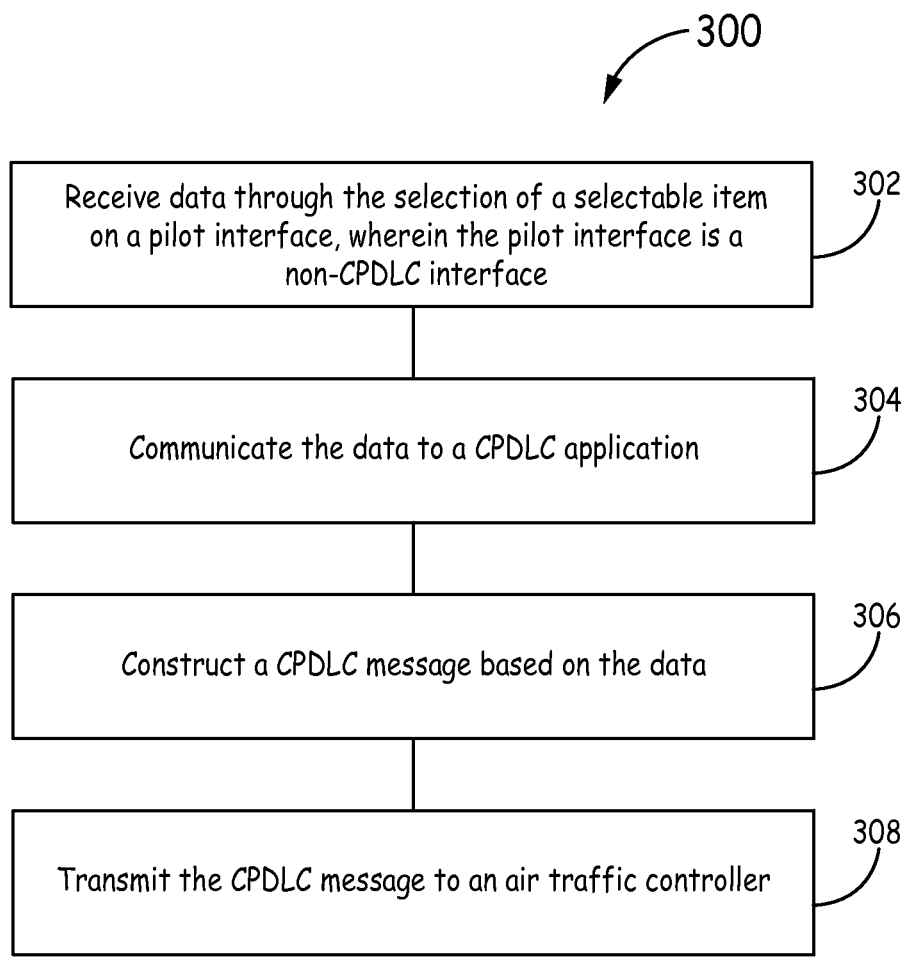
FIG. 3 is a flow diagram of a method for providing context based controller pilot data-link communication in one embodiment described in the present disclosure.

FIG. 3 is a flow diagram of a method 300 for context-based CPDLC. The method 300 proceeds at 302, where data is received through a pilot interface, wherein the pilot interface is a non-CPDLC interface. For example, a pilot may identify data on a navigational display or a primary flight display. Further, method 300 proceeds at 304, where the information is communicated to a CPDLC application. For instance, the data identified by the pilot is sent from the non-CPDLC interface to the CPDLC application. Also, method 300 proceeds at 306, where a CPDLC message is constructed based on the data. When the CPDLC application receives the CPDLC application, the CPDLC application constructs a CPDLC message. In one embodiment, the CPDLC forms the CPDLC message, while in another embodiment, the data is used to populate portions of a CPDLC screen on a CPDLC HMI for further interaction with the pilot. Additionally, the method 300 proceeds at 308, where the CPDLC message is transmitted to an air traffic controller. When the CPDLC message is formed, the CPDLC application transmits the CPDLC message to an air traffic controller.

EXAMPLE EMBODIMENTS

Example 1 includes a method for controller pilot data link communication (CPDLC), the method comprising: receiving data through the selection of a selectable item on a pilot interface, wherein the pilot interface is a non-CPDLC interface; communicating the data to a CPDLC application; constructing a CPDLC message based on the data; transmitting the CPDLC message to an air traffic controller.

Example 2 includes the method of Example 1, further comprising displaying a screen on a CPDLC human machine interface (HMI) based on the data.

Example 3 includes the method of Example 2, wherein the CPDLC HMI receives the data from the non-CPDLC interface.

Example 4 includes the method of any of Examples 2-3, wherein the screen is displayed on the CPDLC HMI as directed by the CPDLC application, wherein the screen is related to the data received through the pilot interface.

Example 5 includes the method of any of Examples 1-4, wherein the CPDLC message is selected through the non-CPDLC interface and the CPDLC application constructs the CPDLC message by transmitting the CPDLC message to the air traffic controller.

Example 6 includes the method of any of Examples 1-5, wherein the non-CPDLC interface displays at least one menu showing different CPDLC messages that can be formed from information displayed on the non-CPDLC interface.

Example 7 includes the method of any of Examples 1-6, wherein the non-CPDLC interface is at least one of: a multifunction display; a primary flight display; an electronic flight bag; and a navigational display.

Example 8 includes the method of any of Examples 1-7, further comprising: receiving an uplink message from the air traffic controller; displaying received information on the pilot interface, wherein the received information is derived from the uplink message.

Example 9 includes a controller-pilot data link communication (CPDLC) system, the system comprising: a CPDLC application executed by a processing unit, wherein the CPDLC application forms CPDLC messages and communicates the CPDLC messages through a communication interface to an air traffic controller; at least one non-CPDLC interface, wherein the non-CPDLC interface presents information and is configured to receive data from a pilot, wherein the non-CPDLC interface passes the data to the CPDLC application, wherein the CPDLC application forms at least one CPDLC message based on the data.

Example 10 includes the system of Example 9, further comprising a CPDLC human machine interface (HMI) wherein the CPDLC HMI displays CPDLC screens to a pilot, wherein the screens show CPDLC data used to form the CPDLC messages.

Example 11 includes the system of Example 10, wherein the CPDLC HMI receives CPDLC data to display from the at least one non-CPDLC interface.

Example 12 includes the system of any of Examples 10-11, wherein the CPDLC screens are displayed on the CPDLC HMI as directed by the CPDLC application, wherein the screen is related to the data received through the non-CPDLC interface.

Example 13 includes the system of any of Examples 9-12, wherein the CPDLC message is selected through the non-CPDLC interface and the CPDLC application constructs the CPDLC message by transmitting the CPDLC message to the air traffic controller.

Example 14 includes the system of any of Examples 9-13, wherein the non-CPDLC interface displays at least one menu showing different CPDLC messages that can be formed from the data displayed on the non-CPDLC interface.

Example 15 includes the system of any of Examples 9-14, wherein the non-CPDLC interface is at least one of: a multifunction display; a primary flight display; an electronic flight bag; and a navigational display.

Example 16 includes a system for communicating controller pilot data link (CPDLC) messages, the system comprising: a CPDLC application executed by a processing unit, wherein the CPDLC application forms CPDLC messages and communicates the CPDLC messages through a communication interface to an air traffic controller; a CPDLC human machine interface (HMI), wherein the CPDLC HMI displays CPDLC screens to a pilot, wherein the screens show CPDLC data used to form the CPDLC messages; at least one non-CPDLC pilot interface, wherein the non-CPDLC interface presents information and is configured to receive data from a pilot, wherein the non-CPDLC interface passes the data to the CPDLC application, wherein the CPDLC application forms at least one CPDLC message based on the data.

Example 17 includes the system of Example 16, wherein the CPDLC HMI receives CPDLC data to display from the at least one non-CPDLC interface.

Example 18 includes the system of any of Examples 16-17, wherein the screens are displayed on the CPDLC HMI as directed by the CPDLC application, wherein the screens are related to the information received through the pilot interface.

Example 19 includes the system of any of Examples 16-18, wherein the CPDLC message is selected through the non-CPDLC interface and the CPDLC application constructs the CPDLC message by transmitting the CPDLC message to the air traffic controller.

Example 20 includes the system of any of Examples 16-19, wherein the non-CPDLC interface displays at least one menu showing different CPDLC messages that can be formed from the data displayed on the non-CPDLC interface.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for controller pilot data link communication (CPDLC), the method comprising:
   receiving data through the selection of a selectable item on a non-CPDLC screen on a pilot interface, wherein the pilot interface is a non-CPDLC interface and the non-CPDLC screen is used for non-CPDLC tasks;
   communicating the data to a CPDLC application;
   constructing a CPDLC message based on the data;
   transmitting the CPDLC message to an air traffic controller; and
   displaying a CPDLC screen on a CPDLC human machine interface (HMI) based on the data, wherein the pilot interface is an HMI that receives commands from or provides data to a pilot on a separate device from the device hosting the CPDLC HMI.

2. The method of claim 1, wherein the CPDLC HMI receives the data from the non-CPDLC interface.

3. The method of claim 1, wherein the screen is displayed on the CPDLC HMI as directed by the CPDLC application, wherein the screen is related to the data received through the pilot interface.

4. The method of claim 1, wherein the CPDLC message is selected through the non-CPDLC interface and the CPDLC application constructs the CPDLC message by transmitting the CPDLC message to the air traffic controller.

5. The method of claim 1, wherein the non-CPDLC interface displays at least one menu showing different CPDLC messages that can be formed from information displayed on the non-CPDLC interface.

6. The method of claim 1, wherein the non-CPDLC interface is at least one of:
   a multifunction display;
   a primary flight display;
   an electronic flight bag; and
   a navigational display.

7. The method of claim 1, further comprising:
   receiving an uplink message from the air traffic controller; and
   displaying received information on the pilot interface, wherein the received information is derived from the uplink message.

8. A controller-pilot data link communication (CPDLC) system, the system comprising:
   a CPDLC application executed by a processing unit, wherein the CPDLC application forms CPDLC messages, displays a CPDLC screen on a CPDLC interface, and communicates the CPDLC messages through a communication interface to an air traffic controller; and
   at least one non-CPDLC interface, wherein the non-CPDLC interface presents information and is configured to receive data from a pilot through at least one non-CPDLC screen, wherein the non-CPDLC screen is used for non-CPDLC tasks, wherein the non-CPDLC interface passes the data to the CPDLC application, wherein the CPDLC application forms at least one CPDLC message based on the data, wherein the at least one non-CPDLC interface is an interface that receives commands from or provides data to a pilot on a separate device from the device hosting the CPDLC interface.

9. The system of claim 8, further comprising a CPDLC human machine interface (HMI) wherein the CPDLC HMI displays CPDLC screens to a pilot, wherein the screens show CPDLC data used to form the CPDLC messages.

10. The system of claim 9, wherein the CPDLC HMI receives CPDLC data to display from the at least one non-CPDLC interface.

11. The system of claim 9, wherein the CPDLC screens are displayed on the CPDLC HMI as directed by the CPDLC application, wherein the screen is related to the data received through the non-CPDLC interface.

12. The system of claim 8, wherein the CPDLC message is selected through the non-CPDLC interface and the CPDLC application constructs the CPDLC message by transmitting the CPDLC message to the air traffic controller.

13. The system of claim 8, wherein the non-CPDLC interface displays at least one menu showing different CPDLC messages that can be formed from the data displayed on the non-CPDLC interface.

14. The system of claim 8, wherein the non-CPDLC interface is at least one of:
- a multifunction display;
- a primary flight display;
- an electronic flight bag; and
- a navigational display.

15. A system for communicating controller pilot data link (CPDLC) messages, the system comprising:
- a CPDLC application executed by a processing unit, wherein the CPDLC application forms CPDLC messages and communicates the CPDLC messages through a communication interface to an air traffic controller;
- a CPDLC human machine interface (HMI), wherein the CPDLC HMI displays CPDLC screens to a pilot provided by the execution of the CPDLC application on the processing unit, wherein the screens show CPDLC data used to form the CPDLC messages; and
- at least one non-CPDLC pilot interface, wherein the non-CPDLC interface presents information and is configured to receive data from a pilot through at least one non-CPDLC screen, wherein the non-CPDLC screen is used for non-CPDLC tasks, wherein the non-CPDLC interface passes the data to the executing CPDLC application, wherein the CPDLC application forms at least one CPDLC message based on the data, wherein the at least one non-CPDLC pilot interface is a HMI that receives commands from or provides data to a pilot on a separate device from the device hosting the CPDLC HMI.

16. The system of claim 15, wherein the CPDLC HMI receives CPDLC data to display from the at least one non-CPDLC interface.

17. The system of claim 15, wherein the screens are displayed on the CPDLC HMI as directed by the CPDLC application, wherein the screens are related to the information received through the pilot interface.

18. The system of claim 15, wherein the CPDLC message is selected through the non-CPDLC interface and the CPDLC application constructs the CPDLC message by transmitting the CPDLC message to the air traffic controller.

19. The system of claim 15, wherein the non-CPDLC interface displays at least one menu showing different CPDLC messages that can be formed from the data displayed on the non-CPDLC interface.

* * * * *